Oct. 21, 1958

W. C. STAFFORD 2,856,894

APPARATUS FOR APPLYING HARD-FACING MATERIAL

Filed May 11, 1956

INVENTOR.
WILLIAM C. STAFFORD
BY
McDonald & Teagno
ATTORNEYS

Oct. 21, 1958 — W. C. STAFFORD — 2,856,894
APPARATUS FOR APPLYING HARD-FACING MATERIAL
Filed May 11, 1956 — 4 Sheets-Sheet 2

INVENTOR.
WILLIAM C. STAFFORD
BY
ATTORNEYS

Oct. 21, 1958 W. C. STAFFORD 2,856,894
APPARATUS FOR APPLYING HARD-FACING MATERIAL
Filed May 11, 1956 4 Sheets-Sheet 3
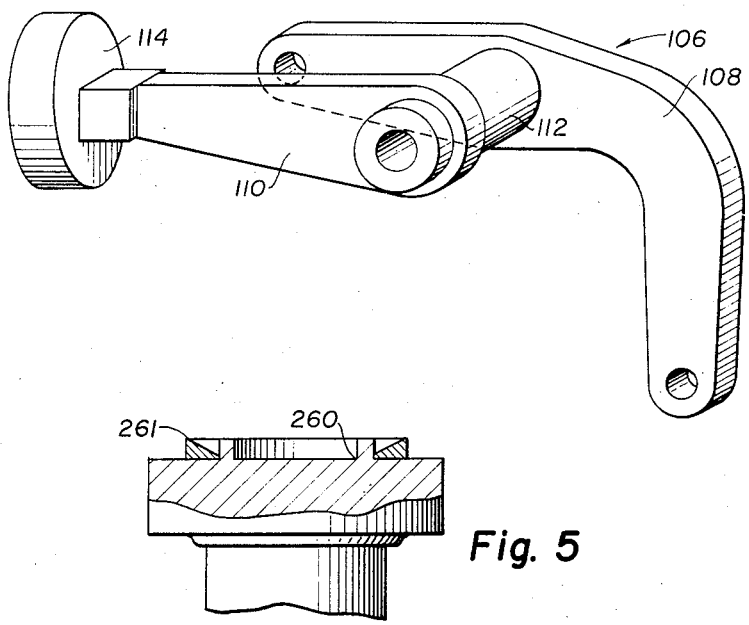
Fig. 4
Fig. 5
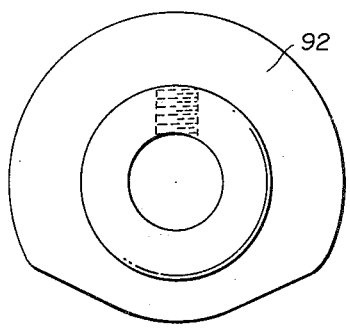
Fig. 6
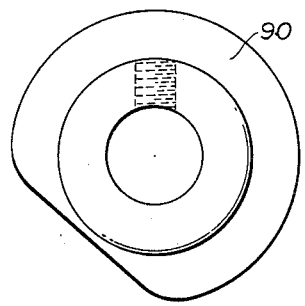
Fig. 7
INVENTOR.
WILLIAM C. STAFFORD
BY
McDonald & Feagns
ATTORNEYS United States Patent Office 2,856,894
Patented Oct. 21, 1958

2,856,894

APPARATUS FOR APPLYING HARD-FACING MATERIAL

William C. Stafford, Battle Creek, Mich., assignor to Eaton Manufacturing Company, Cleveland, Ohio, a corporation of Ohio Application May 11, 1956, Serial No. 584,308

5 Claims. (Cl. 118—47)

This invention relates to a method and apparatus for the application of hard-facing material to a matrix metal and especially to the application of a hard-facing material to engine valves and valve seats to resist wear, abrasion, and oxidation at high temperatures.

Heretofore, application has been carried out by manual operation or by apparatus which has not proved satisfactory. The manual application of hard-facing material accomplished by gas welding and applying deposits of hard-facing material on the valve and the valve seat insert has been slow and the welds have been non-uniform with a resulting high percent of scrap.

It is an object of this invention to provide a method and apparatus for applying a hard-facing alloy to valves, valve seats, and the like.

Another object of this invention is to provide a method and means to rapidly and uniformly apply hard-facing material to valves and valve seats.

These and other objects and advantages will become more apparent from the following detailed description of the device, of the method, and from the accompanying drawings.

Figure 4 illustrates one of the levers of the apparatus.

Figure 5 is a work holder adapted to position a valve seat insert for application of hard-facing material to the valve seat.

Figure 6 is a side view of one of the torch positioning cam plates.

Figure 7 is a side view of the other torch positioning cam plate.

Figure 1:
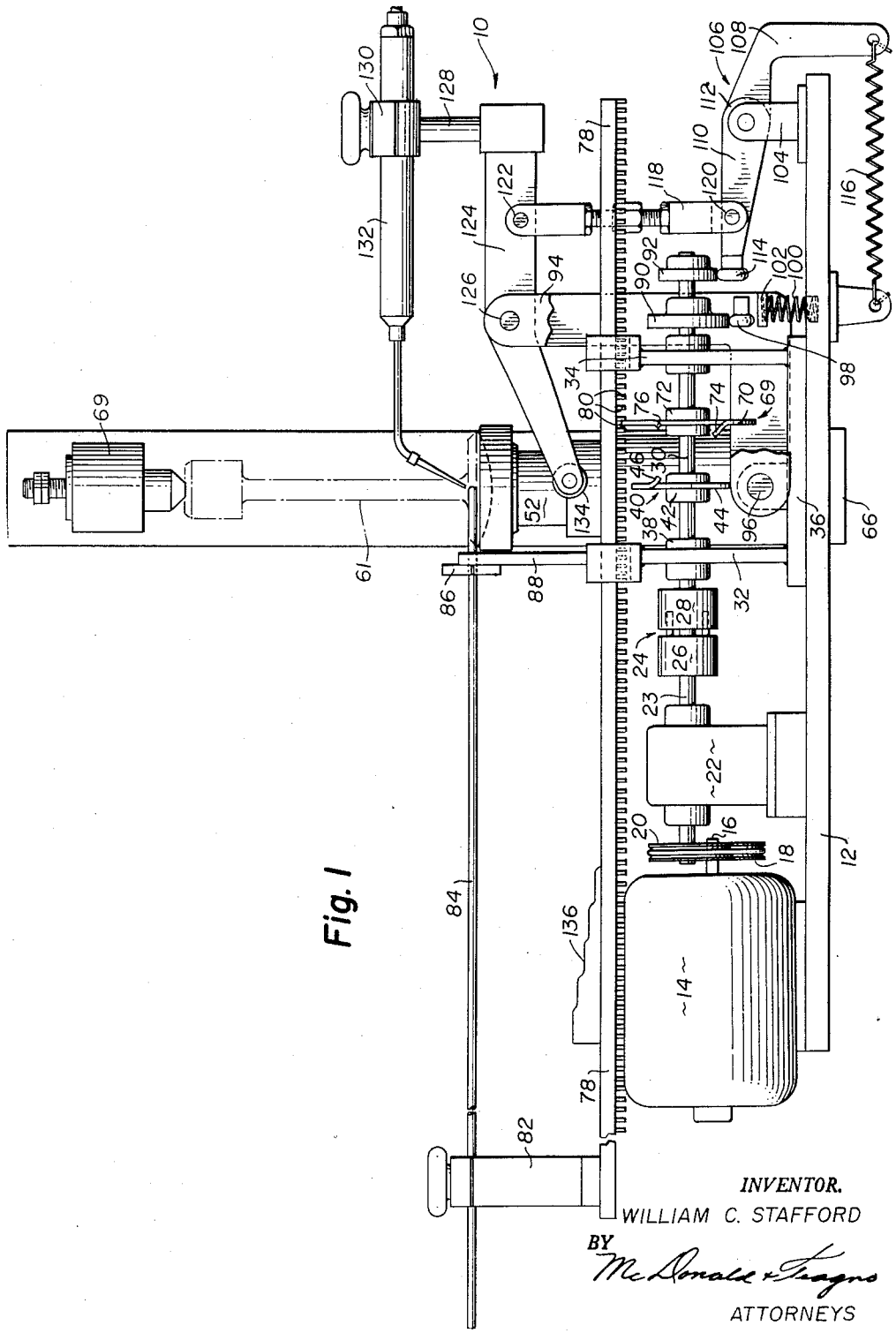
Figure 1 is a side view of the apparatus for applying the hard-facing material.
Figure 2:
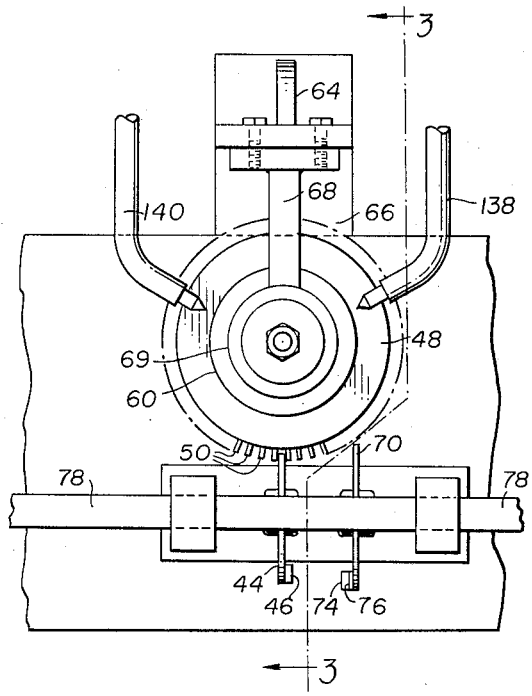
Figure 2 is a top view of portions of the apparatus shown in Figure 1.

Referring to the drawing for a more detailed description, an apparatus 10 for applying the hard-facing material is comprised of a base plate 12 which has a driving motor 14 rigidly mounted thereon. The output shaft 16 of motor 14 is provided with a suitable belt, chain, or gear drive 18 which drives the input member 20 of speed reducer 22 and the output 23 of speed reducer 22 is adapted to drive the input element 26 of clutch 24. The driven element 28 of clutch 24 is drivingly connected to a shaft 30 which is supported in bearing blocks 32 and 34 of the sub-base assembly 36.

A collar 38 is suitably attached to the bearing block 32, as by welding, to provide an elongated bearing for the shaft 30. A valve rotating cam assembly 40 is rotatably and longitudinally fixed to the shaft by means of a cam member hub portion 42 which is suitably attached to the shaft 30. A cam plate 44 is fixed to the hub member 42 and consequently, is adapted to be rotated by the shaft 30. The cam plate 44 is provided with a laterally projecting finger member 46 which is adapted to impart intermittent rotary movement to a rotary indexing plate 48 having a plurality of indexing slots 50 located about the circumference of indexing plate 48. A valve rotating head assembly 52 has a base portion 54 which is provided with a flange 56 mounted on the base plate 12. A rotating head portion 58 has fixed thereto the rotary indexing plate 48. A valve holder 60 grippingly receives a valve 61 and the valve holder is fixed for rotation with the rotating head portion 58. With this arrangement, an intermittent rotation of the rotary indexing plate 48 results in intermittent rotation of the valve holder 60 and the valve 61.

An upper valve positioning assembly 62 is comprised of a vertical supporting member 64 which is mounted on a sub-plate 66, which is suitably attached to the base plate 12. An extension bracket 68 is fixed to the upper portion of supporting member 64 and has fixed thereto a vertically adjustable centering assembly 69 to provide a positioning means for the stem of the work piece.

A weld rod feed cam assembly 69 comprises a cam plate 70 which is provided with a hub 72. The hub 72 is suitably attached to shaft 30 and the cam plate 70 is provided with a pair of peripherally spaced, laterally projecting finger portions 74 and 76.

The upper unsupported ends of the bearing blocks 32 and 34 are provided with cutout track portions to receive a reciprocable rack member 78 which is provided with uniformly spaced elements 80 which serve as the rack teeth. The cam plate 70 is arranged with respect to the rack 78 in a manner such that the peripheral portion cam plate 70 extends between adjacent elements 80 of the rack 78 so that when the cam plate 70 is rotated, the rack will be moved longitudinally. A detailed description of this movement is set forth in a cycle of operation which is subsequently set forth.

Vertically mounted on the end of rack 78 is a welding rod clamp 82 which is adapted to grip and support a length of welding rod 84. A rod resting member 86 is fixed to an extension bracket 88 which is connected to the bearing block 32.

The shaft 30 has fixedly mounted on the end remote from the clutch 24 a pair of spaced, torch positioning cam plates 90 and 92. These cam plates are shown separately in Figures 6 and 7. An L-shaped lever 94 is pivotally mounted at 96 on the sub-base assembly 36 and cam follower 98 is fixed to the lever 94 and contacts the peripheral surface of the cam plate 90. A compression spring 100 is interposed between the base plate 12 and a projecting ear 102 on the lever 94 so that the follower 98 is biased against the cam plate 90.

A mounting bracket 104 is positioned on the base plate 12 and has pivotally mounted thereon a lever assembly 106 which is comprised of a bell-crank 108 and a follower arm 110. This lever assembly is shown in detail in Figure 4. A hub portion 112 is arranged to fixedly connect the bell-crank 108 to the follower lever 110. A follower 114 is mounted on the end of the follower arm 110 and is arranged to contact the peripheral surface of the cam plate 92. A tension spring 116 is connected to one end of the bell-crank 108 and functions as a means to bias the follower 114 against the cam plate 92.

An adjustable link 118 is pivotally connected at 120 to the end of the bell-crank remote from the spring connection and is also pivotally connected at 122 to a movable torch positioning lever 124. The L-shaped lever 94 is also pivotally connected to the movable torch positioning lever 124 at 126. A laterally projecting extension 128 is connected to the movable torch positioning lever 124 and has mounted thereon a torch mounting bracket 130 with a torch 132 adapted to be held in the bracket 130. The lever 124 has also fixed thereto a cam follower 134 which is adapted to cooperate with a cam 136 mounted on the rack 78. A pair of preheating torches 138 and 140 are provided to heat the valve holder. Obviously, a different number of preheating torches could be provided, if so desired.

In order to facilitate an understanding of the operation of this device, a complete operating cycle of the structure is set forth as follows.

Figure 3:
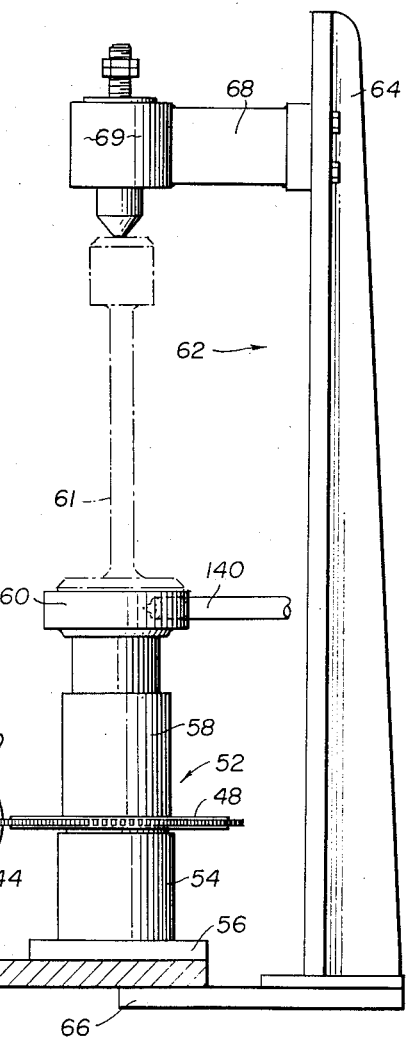
Figure 3 is a section taken at 3—3 on Figure 2.

When it is desired to apply a layer of hard-facing material on the seat portion of the valve, a valve is either manually or automatically placed in the holding means and the clutch 24 is engaged to transmit rotation from the motor to the cam plates 44, 70, 90, and 92. The rotation of the shaft 30 is in a clockwise direction as viewed in Figure 3.

When the cycle of operation begins, the cam plate 92 is in a position such that the follower 114 is contacting the initial portion of the developed surface of the cam plate 92, whereupon as rotation of the shaft 30 is continued, the follower completes its movement on the developed surface of the cam plate 92. When the follower is on the developed surface of the cam, the torch 132 is in a preheating position. As rotation of the shaft 30 is continued, the follower approaches the initial portion of the base circle of the cam which results in a counterclockwise movement of the lever assembly 106 and a consequent upward movement of the torch 132 to the welding position. At this time the welding rod 84 is in a position so that a portion of the rod adjacent the valve can be melted upon the valve. As the shaft 30 continues clockwise rotation, the follower 114 is in contact with the base circle of cam plate 92 and during this period, that portion of the weld rod adjacent the valve is puddled or melted onto the valve surface. At the time the follower 114 reaches the end of the base circle of cam plate 92 and begins contact with the developed surface, the laterally projecting finger 76 of cam plate 70 is passing between adjacent projections 80 on rack 78, and the laterally projecting finger 46 of cam plate 44 is passing adjacent indexing slots 50 of indexing plate 48.

Therefore, the following movements are effected. As the follower 114 contacts the beginning of the developed surface of the cam plate 92, the torch 132 is moved closer to the valve or to a preheating position. When the laterally projecting finger 76 passes between adjacent projections 80 on rack 78, the welding rod 84 is retracted from a position proximate to the valve, and when the laterally projecting finger 46 of cam plate 44 passes adjacent indexing slots 50 of indexing plate 48, the valve is indexed one position ahead.

As the shaft 30 continues rotation, the base circle of cam plate 92 contacts the follower 114 which results in the torch 132 moving away from the valve or to a welding position.

Simultaneously, the laterally projecting finger 74 of cam plate 70 passes between adjacent projections 80 and the welding rod 84 is advanced to the welding position. Again, the follower 114 contacts the base circle of cam plate 92 and during this rotation on the base circle, the welding rod is again puddled on the valve and the cycle is repeated.

For some operations, such as completely covering the face of a valve with a hard-facing material (wherein the valve would be positioned with the stem downwardly), it is desirable to move the torch not only to a welding and preheating position, but also to move the torch longitudinally.

Such movement is effected by the cam plate 90 and the follower 98 which is attached to the L-shaped lever 94. The cam plate 90 is phased with the cam plate 92 so that as the torch is moved from a welding to a preheating position, the torch is longitudinally advanced and longitudinally retracted to the original position by virtue of the action of cam plate 90, during the preheating phase, or when the torch is close to the work. This results in preheating a greater area of the valve.

When the valve is rotated slightly more than one full revolution and the hard-facing material completely covers the valve, the cam plate 136 contacts the follower 134 of lever 124, moving the follower 134 upwardly which causes a movement of the torch away from the work-piece. At this time, the clutch 24 is either manually or automatically disengaged, the rack is returned to its initial position, a new work-piece is inserted, and the cycle of operation is repeated.

Figure 8:
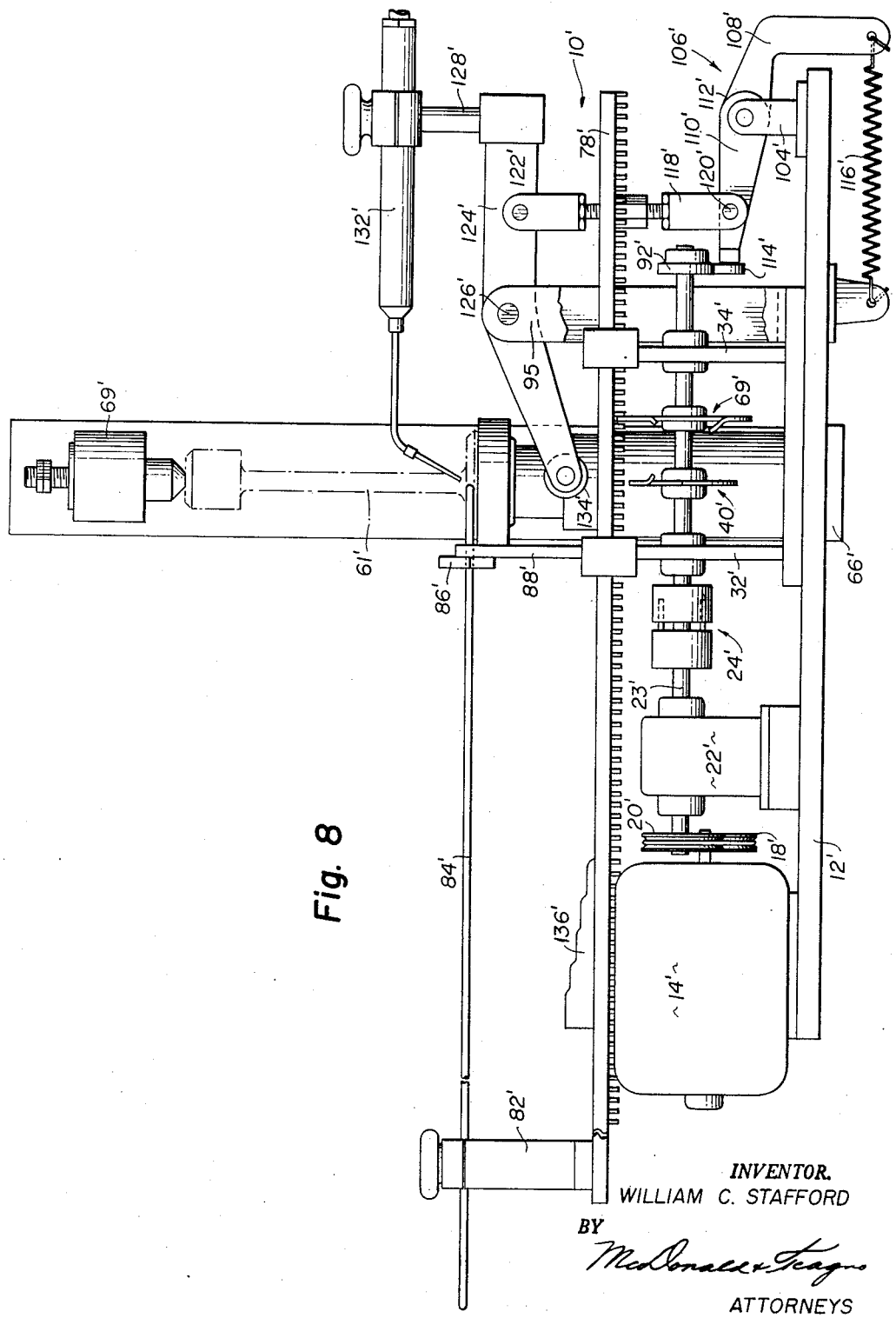
Figure 8 is a modification of the apparatus.

A modification of the above described structure is shown in Figure 8 and all of the parts with the corresponding reference numerals are identical to the structure shown in Figure 1. In this modification, a vertical support bracket 95 is fixed to the base plate 12 and has pivotally mounted at 126' the lever 124'.

Therefore, oscillation of the lever 124' is controlled solely by the lever assembly 106' and link 118'. Such structure is adaptable for use where no longitudinal movement of the torch is required and it is only desired to move the torch to a preheating position and a welding position. It is to be noted, however, that if the structure shown in Figure 1 is to be used in an operation where no longitudinal movement of the torch is required, the cam plate 90 can be replaced with a circular disc so that there is no movement of the follower and consequently, the center 126 remains fixed.

Figure 5 merely illustrates a work holder 260 adapted to position a valve seat insert 261 for application of hard-surfacing material to a portion of the valve seat insert.

While the present invention has been described in connection with certain specific embodiments, it is to be understood that the foregoing description is merely exemplary and that the concept of this invention is susceptible of numerous other modifications, variations, and applications which will be apparent to persons skilled in the art. The invention is to be limited, therefore, only by the broad scope of the appended claims.

What I claim is:

1. An apparatus comprising a rotary work holding means, indexing means adapted to intermittently rotate said work holding means, a longitudinally movable rack means, a weld rod holding means connected to said rack means, cam actuated torch holding means, separate cam means cooperating with said indexing means, said rack means, and said torch holding means, and means to rotate said separate cam means to successively index said work holding means to present a different surface portion of a work piece adapted to be held in said work holding means, and after each indexing operation to move said torch holding means to a preheat position and to retract said weld rod holding means and then to move said torch holding means and said weld rod holding means to a welding position.

2. A welding apparatus comprising a rotary work holding means, work means insertable in said work holding means, indexing means for intermittently rotating said work and work holding means, a reciprocable rack means, weld rod holding means conjointly movable with said rack means, weld rod means adapted to be held by said weld rod holding means, torch holding means, torch means adapted to be held by said torch holding means, separate means cooperable with said indexing means, said rack means, and said torch holding means, and means operable to actuate said separate means and means operable to actuate said separate means to successively index said work and work holding means to present different surface portions of said work and after each indexing operation to move said torch to a preheating position and to retract the weld rod and then to move said torch and said weld rod to a welding position.

3. A welding apparatus comprising a rotary work holding means, indexing means operable to intermittently rotate said work holding means, rotary cam means operable to intermittently rotate said indexing means, rack means, rotating cam means operable to intermittently longitudinally move said rack means, weld rod holding means conjointly movable with said rack means, torch holding means, rotary cam means to selectively move said torch holding means from a preheating position to a welding position, and means to actuate said rotary cam means to successively index said work holding means, and to then move said torch to a preheating position and to retract the weld rod and then to move said torch and said weld rod to a welding position.

4. Apparatus comprising a movable supporting means for an article adapted to have an overlay of metal deposited on a portion thereof, movable means adapted to support a welding rod with one end of the rod in close proximity to the portion of the article upon which the overlay is to be deposited, a welding torch having the flame end thereof arranged in close proximity to the point of overlay deposit on the article as supported on the article supporting means, means for moving the welding rod toward the article supporting means, means for moving the article and the article supporting means, means for supporting and moving the welding torch into closer proximity and away from the portion of the article adapted to have the overlay deposited thereon, and means to actuate each of said means to successively index said article supporting means to present different surface portions of said article, and after each indexing operation to move said torch to said closer proximity position and to retract the welding rod and then to move said torch to said position away from said article and to move said welding rod to a welding position.

5. Apparatus for depositing an overlay of metal on a portion of a metal article comprising indexing means for supporting and intermittently rotating the article about its axis, means for supporting and moving a welding rod in a lineal path, tangent to the portion of the article with one end of the rod in close proximity to the portion of the article, a welding torch, means for supporting and moving the torch with the flame end near the one end of the welding rod, said torch supporting and moving means effective to move the flame end of the torch closer to and away from a preselected point in the path of rotary movement of the article and lineal movement of the rod, and motive means for driving all of said means to successively index said article and present different surfaces thereof, and after each indexing operation to move said torch to said position closer to said preselected point and to retract the welding rod, and then to move said torch to said position away from said preselected point and to move said welding rod to a welding position.

References Cited in the file of this patent

UNITED STATES PATENTS

| | | |
|---|---|---|
| 2,431,781 | Wagner | Dec. 2, 1947 |
| 2,695,941 | Treff | Nov. 30, 1954 |
| 2,726,617 | Knapp | Dec. 13, 1955 |
| 2,726,620 | Meissner | Dec. 13, 1955 |